US012475991B2

(12) United States Patent
Steiner et al.

(10) Patent No.: US 12,475,991 B2
(45) Date of Patent: Nov. 18, 2025

(54) ARTIFICIAL INTELLIGENCE-BASED ASSISTANT FOR CONCURRENT REVIEW OF NEEDLE CORE PROSTATE BIOPSIES

(71) Applicant: Verily Life Sciences LLC, South San Francisco, CA (US)

(72) Inventors: Dave Steiner, Mountain View, CA (US); Michael Terry, Mountain View, CA (US); Jimbo Wilson, Mountain View, CA (US); Andrei Kapishnikov, Mountain View, CA (US); Ben Wedin, Mountain View, CA (US); Kunal Nagpal, Mountain View, CA (US); Davis Foote, Mountain View, CA (US); Carrie Cai, Mountain View, CA (US); Liron Yatziv, Mountain View, CA (US); Matthew Symonds, Mountain View, CA (US); Craig Mermel, Mountain View, CA (US); Pan-Pan Jiang, Mountain View, CA (US); Adam Pearce, Mountain View, CA (US); Rory Sayres, Mountain View, CA (US); Samantha Winter, Mountain View, CA (US); Cameron Chen, Mountain View, CA (US)

(73) Assignee: Verily Life Sciences LLC, Dallas, TX (US)

( * ) Notice: Subject to any disclaimer, the term of this patent is extended or adjusted under 35 U.S.C. 154(b) by 0 days.

(21) Appl. No.: 17/915,424

(22) PCT Filed: Mar. 30, 2021

(86) PCT No.: PCT/US2021/024822
§ 371 (c)(1),
(2) Date: Sep. 28, 2022

(87) PCT Pub. No.: WO2021/202482
PCT Pub. Date: Oct. 7, 2021

(65) Prior Publication Data
US 2023/0122392 A1 Apr. 20, 2023

Related U.S. Application Data
(60) Provisional application No. 63/001,664, filed on Mar. 30, 2020.

(51) Int. Cl.
*G06T 11/60* (2006.01)
*G06T 3/4046* (2024.01)
(Continued)

(52) U.S. Cl.
CPC ........... *G16H 30/40* (2018.01); *G06T 3/4046* (2013.01); *G06T 7/0014* (2013.01);
(Continued)

(58) Field of Classification Search
None
See application file for complete search history.

(56) References Cited

U.S. PATENT DOCUMENTS

| 8,977,024 | B1 * | 3/2015 | Rex | G06T 7/0012 |
| | | | | 382/128 |
| 2003/0095147 | A1 * | 5/2003 | Daw | G01R 33/56 |
| | | | | 715/771 |

(Continued)

FOREIGN PATENT DOCUMENTS

WO WO-2019199392 A1 * 10/2019 ........... G02B 21/367

OTHER PUBLICATIONS

Bulten et al., "Artificial Intelligence Assistance Significantly Improves Gleason Grading of Prostate Biopsies by Pathologists", https://arxiv.org/abs/2002.04500 (Feb. 2020).
(Continued)

*Primary Examiner* — Sultana M Zalalee
(74) *Attorney, Agent, or Firm* — Kilpatrick Townsend & Stockton LLP

(57) ABSTRACT

One example method includes receiving a digital image of a needle core prostate biopsy, displaying, using a display device, a magnified portion of the digital image, obtaining, from a deep learning model, Gleason scores corresponding to patches of the magnified portion of the digital image, and displaying, using the display device, a superimposed overlay on the magnified portion of the digital image based on the Gleason scores and corresponding confidence values of the Gleason scores, the superimposed overlay comprising one or more outlines corresponding one or more Gleason scores associated with the magnified portion of the digital image and comprising image patches having colors based on a Gleason score of the Gleason scores corresponding to an underlying portion of the magnified portion of the digital image and a confidence value of the corresponding Gleason score.

30 Claims, 12 Drawing Sheets

(51) Int. Cl.
*G06T 7/00* (2017.01)
*G06T 11/00* (2006.01)
*G16H 30/40* (2018.01)
*G16H 50/20* (2018.01)

(52) U.S. Cl.
CPC ............ *G06T 11/001* (2013.01); *G06T 11/60* (2013.01); *G16H 50/20* (2018.01); *G06T 2207/10024* (2013.01); *G06T 2207/20081* (2013.01); *G06T 2207/20221* (2013.01); *G06T 2207/30081* (2013.01); *G06T 2207/30096* (2013.01)

(56) References Cited

U.S. PATENT DOCUMENTS

| | | | | |
|---|---|---|---|---|
| 2008/0144896 | A1* | 6/2008 | Burke | G16H 30/20 |
| | | | | 382/128 |
| 2009/0132916 | A1* | 5/2009 | Filatov | G16H 40/63 |
| | | | | 715/700 |
| 2010/0290692 | A1* | 11/2010 | Macaulay | G06T 7/0012 |
| | | | | 382/133 |
| 2014/0233826 | A1* | 8/2014 | Agaian | G06V 20/698 |
| | | | | 382/133 |
| 2014/0314300 | A1* | 10/2014 | Kaufman | G06F 3/04842 |
| | | | | 382/133 |
| 2015/0287194 | A1* | 10/2015 | Schoenmeyer | G06F 3/04845 |
| | | | | 382/128 |
| 2016/0019695 | A1* | 1/2016 | Chukka | G06T 7/0014 |
| | | | | 382/128 |
| 2017/0116744 | A1* | 4/2017 | Abedini | G06T 7/90 |
| 2017/0124701 | A1* | 5/2017 | Liang | A61B 8/5223 |
| 2019/0198160 | A1 | 6/2019 | Barral | |
| 2019/0209116 | A1 | 7/2019 | Sjoestrand et al. | |
| 2020/0066407 | A1* | 2/2020 | Stumpe | G06N 3/045 |
| 2020/0334814 | A1* | 10/2020 | Gholap | G06F 18/241 |

OTHER PUBLICATIONS

Chollet, "Xception: Deep learning with depthwise separable convolutions", Proceedings of the IEEE conference on computer vision and pattern recognition. 2017.

He et al., "Deep residual learning for image recognition", Proceedings of the IEEE conference on computer vision and pattern recognition. 2016.

International Application No. PCT/US2021/024822, "International Search Report and Written Opinion", Jul. 8, 2021, 9 pages.

Ström et al., "Artificial intelligence for diagnosis and grading of prostate cancer in biopsies: a population-based, diagnostic study", The Lancet Oncology 21.2 (2020): 222-232.

* cited by examiner

ARTIFICIAL INTELLIGENCE-BASED ASSISTANT FOR CONCURRENT REVIEW OF NEEDLE CORE PROSTATE BIOPSIES

CROSS-REFERENCE TO RELATED APPLICATIONS

This application is a U.S. National Stage of PCT Application No. PCT/US2021/024822 filed Mar. 30, 2021, which claims priority to U.S. Provisional Patent Application No. 63/001,664, titled "Artificial Intelligence-Based Assistant for Concurrent Review of Needle Core Prostate Biopsies," filed Mar. 30, 2020, the entirety of which are hereby incorporated by reference.

FIELD

This disclosure relates to an Artificial Intelligence (AI) user interface elements designed to facilitate and improve pathologist review of prostate needle core biopsies.

BACKGROUND

Approximately 1 in 9 men will be diagnosed with prostate cancer in their lifetime. The gold standard for diagnosis is a histopathologic evaluation of a prostate biopsy, typically by examination of magnified digital images of the biopsy after staining with Hematoxylin and Eosin (H&E). Prostate needle biopsies containing tumors are further graded using the Gleason system that ranges from Grade Group (GG) 1 to 5, depending on the presence and relative percentages of each Gleason pattern, with a patient's prognosis worsening as the Gleason Group grade increases.

The Gleason score is an essential component of the National Comprehensive Cancer Network (NCCN) risk stratification and corresponding treatment decisions for prostate cancer. Despite its importance, Gleason score grading has substantial inter-pathologist discordance (30-50%) and intra-pathologist variability discordance (15-39%).

Expertise in genitourinary (GU) pathology has been shown to improve diagnostic accuracy and patient risk stratification. Previous studies have demonstrated that pathologists who work in high-volume centers are more consistent, and that pathologic re-review by pathologists with fellowship training in GU pathology improves the prognostic utility of the Gleason score relative to those provided by local institutions. An accurate decision support tool with Gleason grading proficiency comparable to GU subspecialists has the potential to improve the consistency and clinical utility of Gleason grading, especially in settings where subspecialist expertise is unavailable. This disclosure describes an artificial intelligence (AI)-based decision support tool which meets this need.

Prior work is reflected in Strom et al., Artificial intelligence for diagnosis and grading of prostate cancer in biopsies: a population-based, diagnostic study, The Lancet Oncology Vol. 21 issue 2 p. 222-232 (Jan. 8, 2020) and Bulten et al., Artificial Intelligence Assistance Significantly Improves Gleason Grading of Prostate Biopsies by Pathologists, https://arxiv.org/abs/2002.04500 (February 2020).

SUMMARY

Various examples are described for AI-based assistant for concurrent review of needle core prostate biopsies. In one aspect of this disclosure, a system and method is presented which includes integration of advanced AI user interface elements in combination with a viewer displaying digital images of a needle core prostate biopsy to facilitate human grading and classification of the biopsy. The viewer further includes a tool for navigating between serial sections cut from the same biopsy, such as display of thumbnail images of each section of the biopsy, which when clicked on causes the associated image to be displayed in the viewer. This combination of the AI user interface elements and the viewer can be configured as an AI-enabled user interface and set of tools available to the pathologist as they review digital images of the biopsy to assist them in making an accurate diagnosis or characterization of the biopsy. This combination of the AI-enabled user interface and set of elements is referred to as an "AI Assistant" in the detailed description. The AI Assistant makes use of a deep learning system or model which generates the predictions that are displayed on the interface.

In one configuration, the user interface elements have four components, which could be implemented separately or preferably together:

(1) Tumor and Gleason pattern localization. This element provides an outline or border around prostate tissue having particular Gleason score, shown superimposed on the underlying H&E image. This element allows the pathologist to not only see the underlying stained image of prostate tissue, but also the areas that the deep learning model classified as tumor (by Gleason score, e.g., Gleason score 3 in green, Gleason score 4 in yellow, etc.) directly superimposed on the underlying tissue.

(2) Tumor and Gleason pattern quantification. This element reports the relative proportion of the tumor of different Gleason scores by area, and total tumor as percent of the tissue area on the slide. For example, this element could report that the tumor area determined to be Gleason score 3 is 75 percent of the total tumor area, and the tumor area of Gleason score 4 is 25 percent of the total tumor area, and that the total area identified as tumorous is 38 percent of the total tissue area.

(3) Final Gleason Grade group classification for the overall slide. This element reports final Gleason scoring characterization, including both primary and secondary Gleason scoring, e.g., 3+4 in the conventional two-digit Gleason scoring system, and the overall Gleason Grade Group, e.g., Grade Group 2, for the entire slide.

(4) AI Confidence. This element provides features for display of information relating to the AI system's confidence on the underlying Gleason score predictions on a patch-by-patch basis. This display of confidence can be configured as an overlay over the underlying tissue image. Preferably, the tool includes a feature whereby the user has the ability to change the opacity of this confidence information overlay, or quickly toggle the overlay on or off, e.g., to facilitate human understanding of the model confidence and uncertainty for the associated patches in the prostate image. For example, the confidence information can take the form of an array of colored rectangles, color coded to colors assigned to predictions as to the Gleason score for patches of the magnified digital image (yellow, green etc.). Each rectangle corresponds to and overlays a patch in the magnified digital image. The relative size of the two colors in each rectangle indicate the relative confidence in the correctness of the Gleason score for the underlying patch as derived from the deep learning model softmax output for each class. For example, a rectangle that is mostly yellow, coded to Gleason score 4, and only has a relatively small area of green, color coded to Gleason score 3, indicates that the model is confident that the prediction of Gleason score 4 for the underlying patch is more likely correct than a score of Gleason 3. Thus, in each rectangle the relative size of the colors represents the relative confidence of the model in the predictions as to the Gleason score for the corresponding patch. The user can adjust the opacity of this confidence information, for example full opacity in which the user only sees the confidence information, partial opacity, in which the user can see the underlying tissue to some degree but with the confidence information also visible, to minimal or low opacity, in which the user sees mostly the underlying tissue image and only faintly sees the confidence information, or quickly toggle the confidence information on or off.

One example system includes a non-transitory computer-readable medium; and one or more processors communicatively coupled to the communications interface and the non-transitory computer-readable medium, the one or more processors configured to execute processor-executable instructions stored in the non-transitory computer-readable medium to receive a digital image of a needle core prostate biopsy; cause a display device to display a magnified portion of the digitized image; obtain, from a deep learning model, Gleason scores corresponding to patches of the magnified portion of the digitized image; and cause the display device to display a superimposed overlay on the magnified portion of the digitized image based on the Gleason scores and corresponding confidence values of the Gleason scores, the superimposed overlay comprising one or more outlines corresponding one or more Gleason scores associated with the magnified portion of the digitized image and comprising image patches having colors based on a Gleason score of the Gleason scores corresponding to an underlying portion of the magnified portion of the digitized image and a confidence value of the corresponding Gleason score.

One example method includes receiving a digital image of a needle core prostate biopsy; displaying, using a display device, a magnified portion of the digitized image; obtaining, from a deep learning model, Gleason scores corresponding to patches of the magnified portion of the digitized image; and displaying, using the display device, a superimposed overlay on the magnified portion of the digitized image based on the Gleason scores and corresponding confidence values of the Gleason scores, the superimposed overlay comprising one or more outlines corresponding one or more Gleason scores associated with the magnified portion of the digitized image and comprising image patches having colors based on a Gleason score of the Gleason scores corresponding to an underlying portion of the magnified portion of the digitized image and a confidence value of the corresponding Gleason score. Further, an example non-transitory computer-readable medium may comprise processor-executable instructions configured to cause one or more processor to perform such a method.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
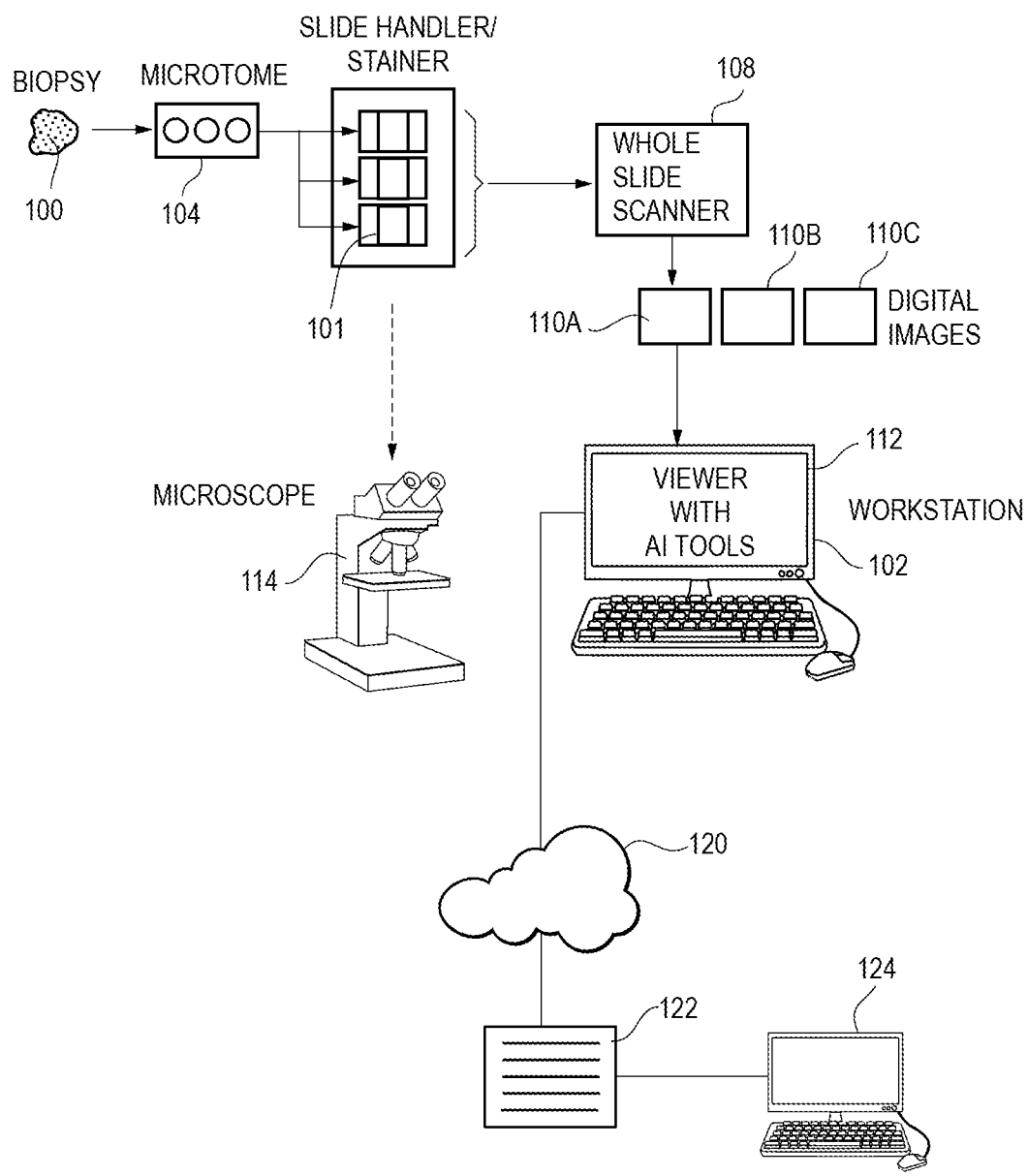
FIG. 1 is a schematic diagram showing a system for creating magnified digital images of a needle core prostate biopsy including a workstation having a viewer for viewing the digital images and AI user interface elements to assist a pathologist in diagnosis of the biopsy.

Before discussing the AI Assistant in detail, attention will be directed initially to FIG. 1 which is a schematic diagram showing a system for creating magnified digital images of a needle core prostate biopsy 100 and a workstation 102 having a user interface including the AI Assistant to assist a pathologist in evaluation and diagnosis of the biopsy 100.

The biopsy 100 is sectioned by a microtome 104 into several thin sections (three in the following discussion), which are then processed in a slide handler and stainer 106 which places each section on a separate microscope slide 107 and applies an H&E stain to the sections. The stained slides are then imaged at various magnifications (e.g., 20×, and 40×) in a whole slide scanner 108, which results in creation of three separate magnified digital images 110A, 110B, 110C of each of the three sections, respectively. The magnified digital images are then made available to the workstation 102 which is used by a pathologist to evaluate the biopsy and make a diagnosis. This workstation 102 includes a display 112 to display a novel user interface and associated viewer and AI user interface elements which will be described in detail later in this document.

In one configuration, the pathologist makes the diagnosis based on his or her interpretation of the underlying magnified digital images, with the aid of the AI Assistant described in detail below. It is also possible for the pathologist to make the diagnosis with the further additional aid of a conventional microscope 114, which is used to view the physical slides 107 directly.

The pathologist using the workstation 112 may enter findings, scores, free text notes etc. via one of the tools on the interface (see the discussion of FIGS. 9 and 10 below) in which case these findings, notes etc. are communicated over computer networks 120 to remote computers or servers 122 and 124, including for example computer systems of a general practitioner treating the patient supplying the biopsy, a specialist ordering the biopsy, etc.

I. The AI Assistant and its Use

Figure 2:
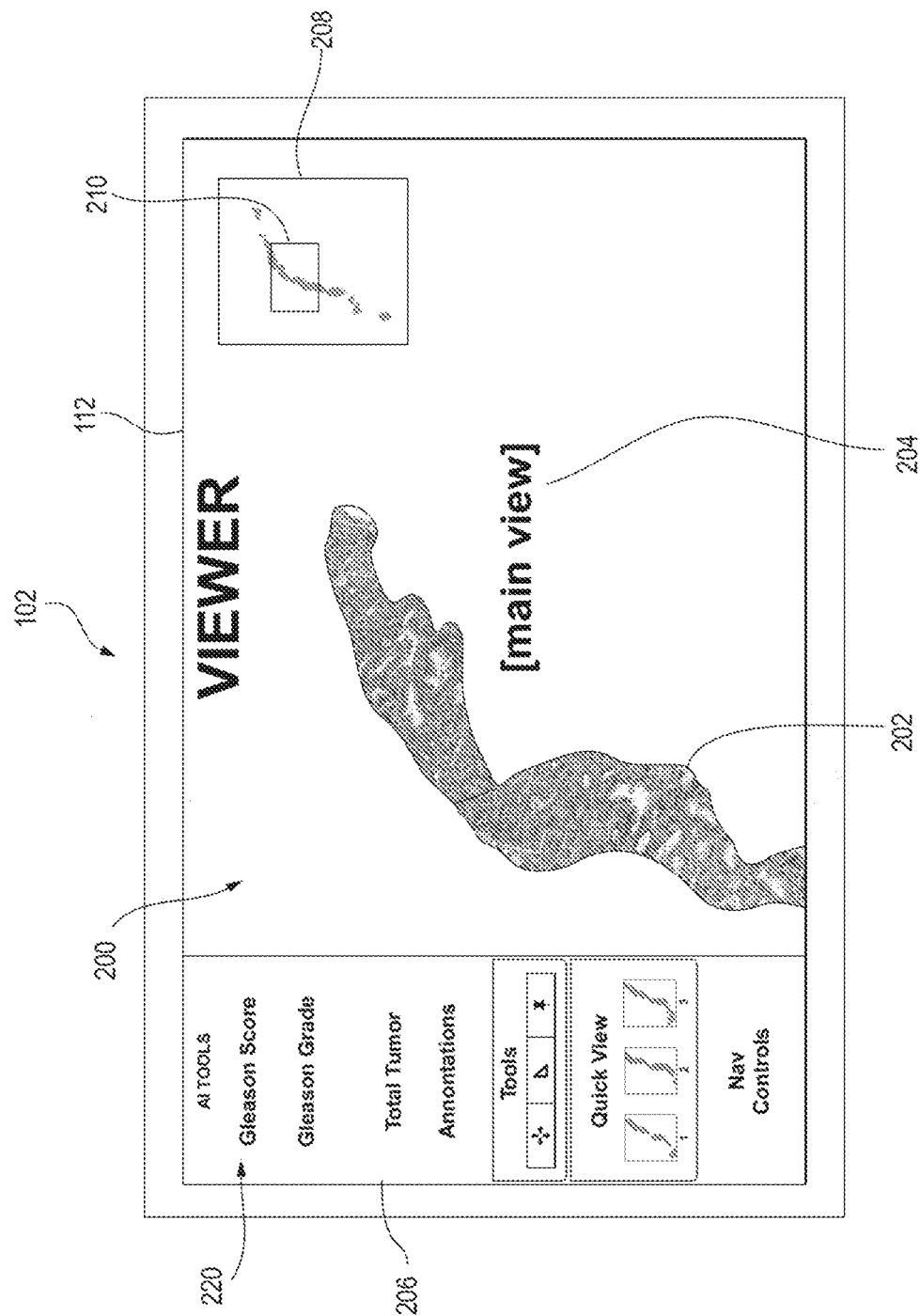
FIG. 2 is an illustration of the workstation display of FIG. 1 showing one possible manner of combining the viewer and the AI user interface elements.

FIG. 2 is an illustration of the workstation display 112 of FIG. 1 showing one possible manner of combining a viewer 200 rendering on the display a magnified digital image 202 of the prostate biopsy, and AI Assistant user interface elements or tools 220 for assisting the pathologist in a diagnosis, in a user interface. In FIG. 2, the viewer 200 includes a main view 204, a sidebar area 206, and a thumbnail view 208. The thumbnail view 208 is a zoomed out version of the main view 204, and shows the entire slide. The rectangular area 210 in the thumbnail view shows the portion of the entire slide that is currently rendered in the main view 204.

The sidebar 206 includes navigation tools to navigate around the slide and select different images to view, in addition to the AI tools 220. FIG. 2 shows an overview of these features of the sidebar, which will be explained in greater detail later in this document.

In one configuration, the AI tools 220 in sidebar 206 feature all of the following:

(1) Tumor and Gleason pattern localization. This tool, when invoked, provides an outline or border around prostate tissue having a particular Gleason score, shown superimposed on the underlying H&E image 202. This tool will be explained in greater detail in FIGS. 3 and 5 below. This tool allows the pathologist to not only see the underlying image of prostate tissue, but also the areas that the AI deep learning model classified as tumor (by Gleason score, e.g., Gleason score 3 in green, Gleason score 4 in yellow, etc.) directly superimposed on the underlying tissue. This tool is accessed under the Annotations section of the region 206, and will be explained in greater detail below in conjunction with FIGS. 3 and 5.

(2) Tumor and Gleason pattern quantification. See FIGS. 3 and 4 at 230. This tool reports the relative proportion of the tumor of different Gleason scores (by area), and total tumor as percent of the entire tissue area on the slide. For example, this tool could report that the tumor area determined to be Gleason score 3 is 75 percent of the total tumor area, and the tumor area of Gleason score 4 is 25 percent of the total tumor area, and that the area identified as tumor is 38 percent of the total tissue area.

(3) Final Gleason Grade group classification for the overall slide. See FIGS. 3 and 4 at 300, described below. This tool reports final Gleason scoring characterization, including both primary and secondary Gleason scoring, e.g., 3+4, or 3+3 in the conventional two-digit Gleason scoring system, and the overall Gleason Grade Group, e.g., Gleason Grade Group 2, for the entire slide.

(4) AI Confidence. See FIG. 5 at 360, FIGS. 6 and 7, described below. This tool provides features for display of information relating to the AI system's confidence on the underlying Gleason score predictions on a patch-by-patch basis. This display of confidence can be configured as an overlay over the underlying tissue image, see FIG. 6. The tools further include a feature whereby the user has the ability to change the opacity of this confidence information overlay, e.g., to facilitate human understanding of the model confidence and uncertainty in the particular scores for the image patches, or toggle it on or off. This tool is also accessed under an "Annotations" section of the region 206, see FIG. 3 at 302, and will be described in greater detail in conjunction with FIGS. 5, 6 and 7.

In the sidebar, the user can select navigation tools and select thumbnail views to navigate between different slides of the biopsy, and tools for controlling magnification that is displayed in the viewer. These features will also be described in more detail below.

Figure 3:
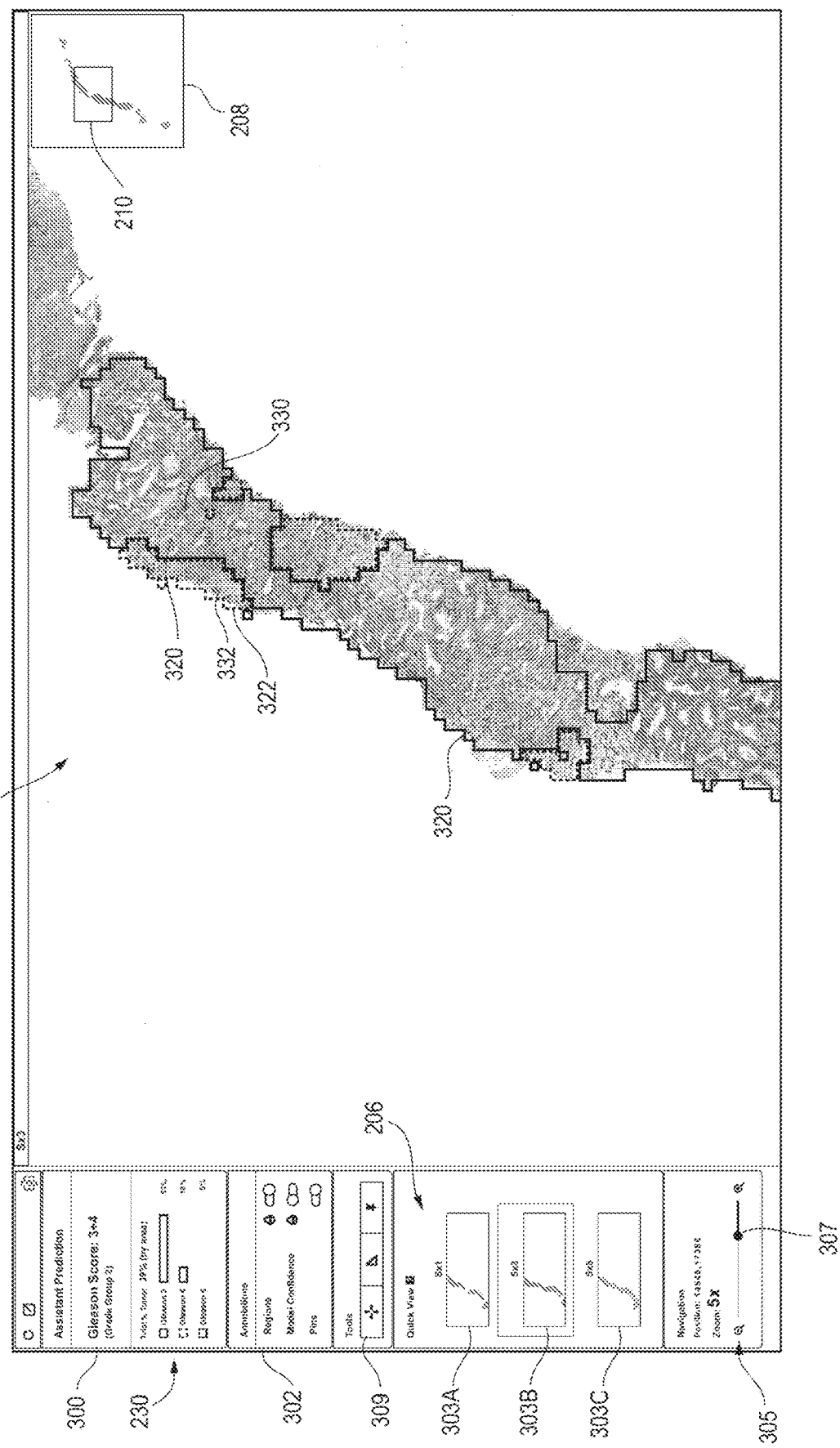
FIG. 3 is a more detailed illustration of the display of FIG. 2, in which portions of the image of the biopsy tissue have boundaries and color shading to indicate tumor areas of particular Gleason scores.

FIG. 3 shows a more detailed illustration of the integration of AI tools with the viewer. In this particular example, there are tools and information available to the pathologist in the sidebar 206, and organized into two panels or regions, namely AI Assistant Predictions panel, and Annotations panel, which will now be described.

1. An AI Assistant Prediction Tool.

The Assistant Prediction section on the sidebar gives a summary of all the predictions. In particular, it reports a total Gleason Score for the slide using the convention two-digit reporting schema, e.g., "3+4" in this example, where 3 indicates the predominant score and 4 is the secondary score. This tool also reports a Gleason Grade Group score, Grade Group 2 in this example, for the overall slide. This tool also reports the total tumor, as a percent of area of the tissue in the entire slide, 39% in this example. Further, this tool also reports the percent (area) of each Gleason pattern. In this example, 82 percent of the tumor area is scored Gleason 3 and 18 percent is scored Gleason 4; no region was scored Gleason 5.

The final prediction of Gleason scoring is not just a direct translation of the Gleason pattern percentages. As such, in rare cases, the final Gleason Score (e.g., 3+4) might not match the pattern percentages exactly. In these cases, the final Gleason score is typically more reliable because it is based on a more holistic reading of the information from all the tissue. This is due, in part by how the deep learning model, see FIG. 11, makes predictions on individual patches and taking into consideration surrounding context, as will be explained later.

As an example, one small patch of Gleason pattern 4 is highlighted by the Assistant on the slide, but the final Gleason Score prediction is "no tumor". In such a case, the Assistant was able to infer that the very small region was actually a false positive.

The colors in the boxes 310, 312 and 314 next to each Gleason score in the tool 300 correspond to the colors of the boundaries and shading that are assigned to the same Gleason score area, respectively, that are overlaid on the digital image. This occurs when the Regions text 306 of the Annotations is activated, e.g., clicked on, triggering display of the patch predictions.

2. Annotation Panel

Figure 4:
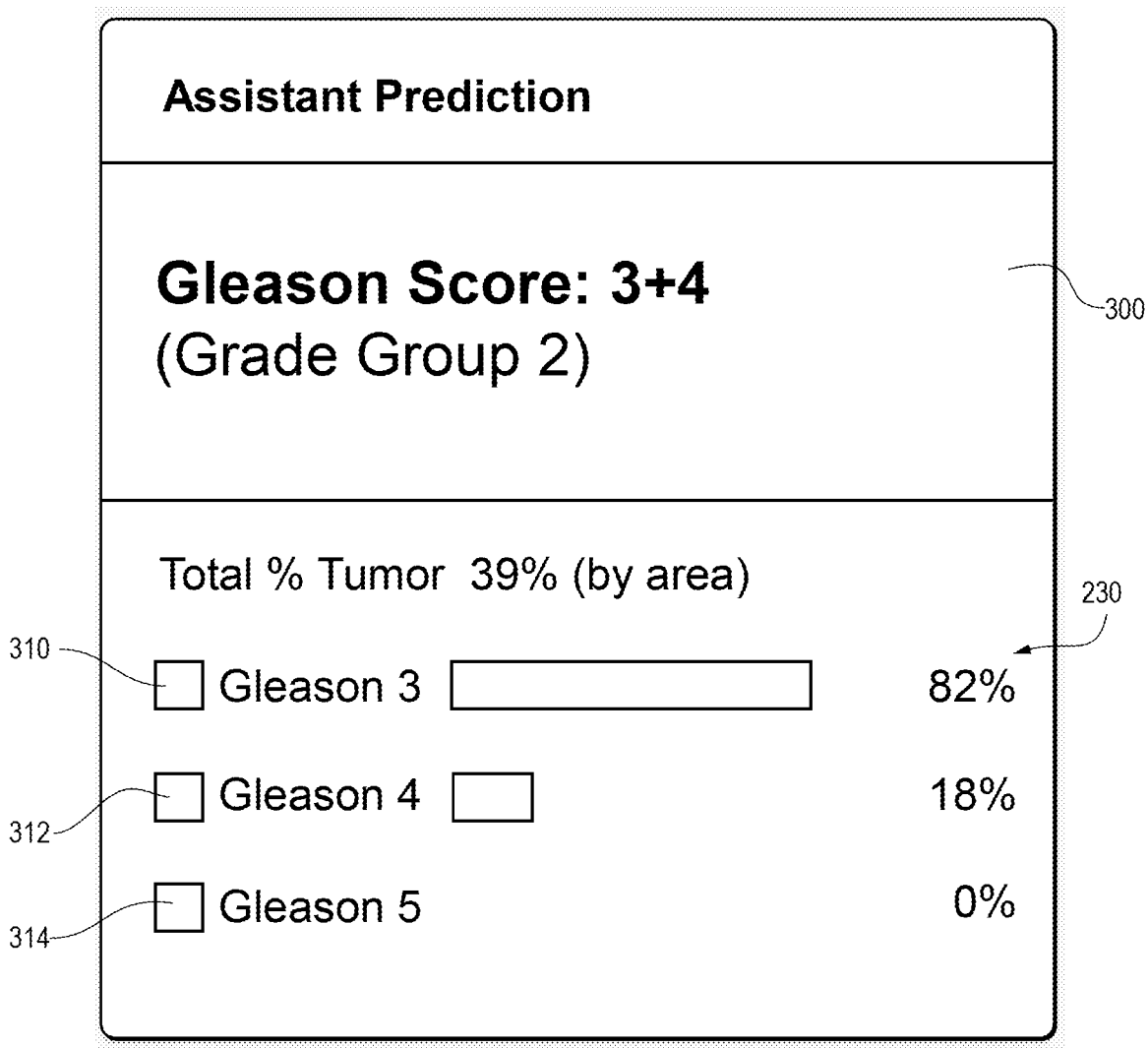
FIG. 4 is an illustration of the quantitative reporting user interface elements of FIGS. 1 and 2.
Figure 5:
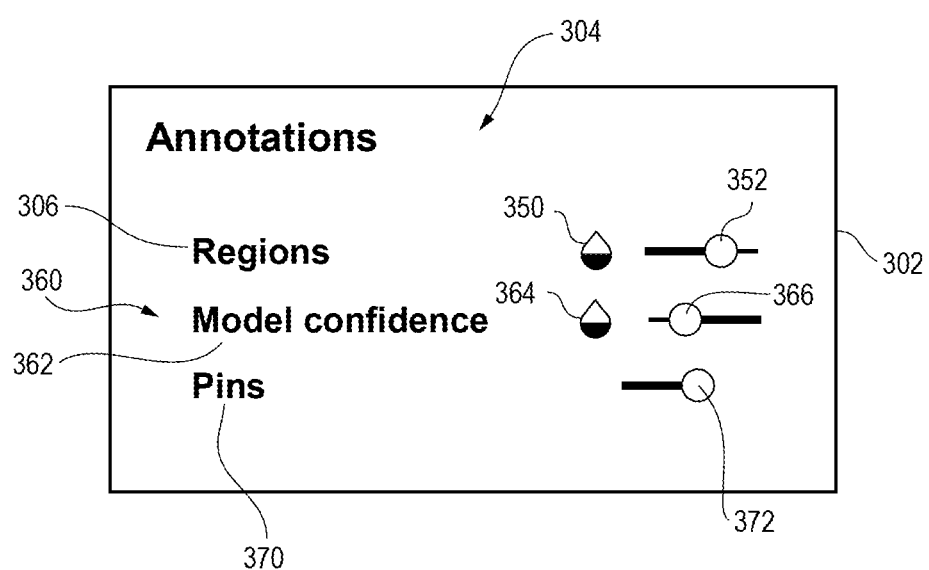
FIG. 5 is an illustration of an "Annotations" portion of the display of FIG. 2 showing AI elements that can be toggled on and off, including a Gleason pattern location feature for display of regions within the magnified image of the biopsy which are assigned particular Gleason scores and model confidence overlays that illustrate the confidence of the machine learning model in the Gleason scores.

The tools include an Annotation region or panel 302, shown in more detail in FIG. 5, which includes a regional Gleason pattern predictions tool 304. In particular, when the user wishes to see the regions of the specimen in which the deep learning model of the AI system has identified as Gleason 3, Gleason 4, etc., the user clicks on the Regions text 306 on the display. A keystroke could also be used to turn this on such as "A". When this action occurs, the tissue image 202 is overlaid with colored boundaries 320 and 322 (See FIG. 3), color coded to the colors of the boxes 310, 312, 314 of FIG. 4, which delineate on a patch-by-patch basis the Gleason score assigned to the patches by the AI deep learning model. For example in FIG. 3, a green boundary 320 is shown superimposed on the tissue image which encloses an area 330 which correspond to an area scored as Gleason 3. A yellow boundary 322 is superimposed on the tissue image which corresponds to an area 332 that are scored Gleason 4 by the AI deep learning model.

In the illustrated embodiment, the patch sizes have an absolute physical dimension, for example 32 μm×32 μm, which at 40× magnification is 128×128 pixels. Because the AI predictions are made on a patch-by-patch basis, and the patches have square shapes, the boundaries of a given Gleason region are not smooth as can be seen in FIG. 3. While the AI predictions are assigned to patches, such predictions take into consideration information of surrounding tissue, i.e., the context of each patch.

Referring again to FIG. 5, the user can control the opacity of the yellow and green color Gleason score overlay and boundary by clicking on the droplet icon 350 and then moving the slider 352 to the left or right. Movement to the left causes less opacity of the overlay and movement of the slider to the right causes greater opacity. Thus, the AI Assistant's patch-based predictions (Gleason 3, Gleason 4, etc.) are shown as outlines on the tissue, but the user is able to change the opacity of these regions, or hide them entirely.

Figure 6:
FIG. 6 is an illustration of a portion of the image of the biopsy in the viewer with color shading superimposed on the tissue image on a patch by patch basis indicating model confidence in the Gleason scoring.

The Annotations region 302 of the sidebar also includes an AI Assistant confidence tool 360. Basically, this tool, when enabled by clicking on the "Model Confidence" text 362 of FIG. 5, triggers display of an overlay on the tissue image which provides information about how confident the deep learning model is in its Gleason score predictions for each individual patch in the underlying image. This overlay is shown in FIG. 6 as a pattern of rectangles 602 and 604, one rectangle for one underlying image patch. Each of the rectangles has various proportions of yellow and green, with some rectangles mostly or entirely of one color or another and others of varying degrees of one color or another, depending on the deep learning model softmax output (prediction of Gleason score for the underlying patch). In the case where the predictions are based on square patches, the rectangles 600, 602 are also square in shape so that each square completely overlaps its associated underlying image patch.

Figure 7:
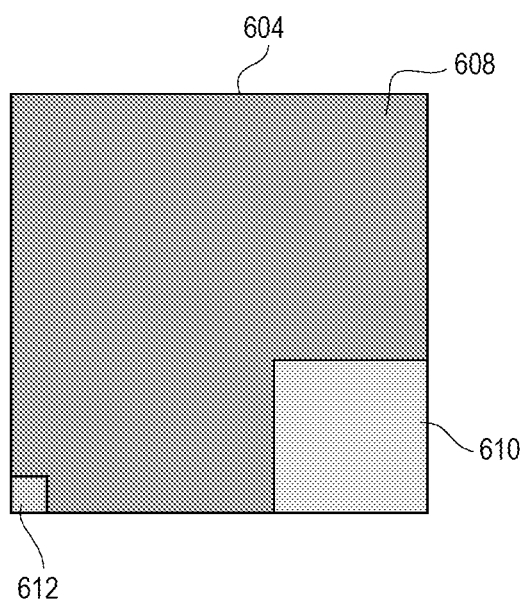
FIG. 7 is an illustration of one of the colored rectangles of FIG. 6 showing the manner in which the confidence in Gleason score is represented.

Referring to FIG. 7, one such square is shown at 605. This particular square has two different colored regions 608 and 610, for example region 608 is the color green and corresponds to Gleason 3 and region 610 is yellow and corresponds to Gleason 4. The more predominant the area of a particular color in the square, the more confident the deep learning model of the Assistant (FIG. 11) is in the prediction for the Gleason pattern associated with that color. For example, in the FIG. 7 square 604, the area of the color 608 predominates to a large degree over the area of the color 610, indicating that the AI deep learning earning model is much more confident in the assignment of the score of Gleason 3 to the underlying patch that it is for an assignment of a score of Gleason 4 to that patch. If the AI deep learning model also found areas of a third Gleason score in the image, then a third color could be also represented in the square, assuming a non-zero prediction for the third Gleason score assigned to that patch. For example, if the AI machine learning model found there was a 2% probability of the underlying patch was Gleason 5 (color coded to red), a small red region 612 could be present in the square 604 occupying 2 percent of the area of the square 604.

Referring again to FIG. 6, by looking over a larger region of the tissue of many patches, the mixture of the colors of the top two Gleason patterns can give the user a sense for the assistant confidence over that region.

The confidence overlay is turned on and off by pressing or clicking on the Model Confidence toggle 362 on the sidebar, or by using a keyboard shortcut key, such as an "0" shortcut (Confidence "O"verlay).

Still referring to FIG. 5, the user can adjust the opacity of the confidence visualization overlay by pressing the droplet icon 364 and adjusting the slider 366 that appears adjacent to it. In FIG. 6, the opacity is toggled to maximum by moving the slider 366 all the way to the right, which causes the appearance shown in FIG. 6 in which the underlying tissue image is not visible. By sliding the slider 366 to the left, the opacity can be diminished such that the user can see both the model confidence overlay and underlying tissue at least to varying degrees.

The annotations tools 302 includes a Pins tool 370, which when pressed or clicked on allows the user to place virtual pins on the slide image, for example to mark the location of particular tissue of interest. The slider 372 allows the user to show the location of existing pins in the image by sliding the slider to the right, or hide them by sliding the slider to the left.

As noted previously, the patient's biopsy will typically be sectioned into 3 or possibly more slides, each being imaged separately, and the process of evaluating the digital magnified image using the tools described above will occur for each slice or section of the biopsy. The pathologist can select which section image to review by clicking on one of the thumbnail views 303A, 303B, 303C in the lower left portion of the sidebar of FIG. 3, with each thumbnail corresponding to one of the three sections of the biopsy. When one of the thumbnails is selected the thumbnail is also presented in the upper right portion of the viewer as shown at 208 in FIG. 3. The box 210 indicates the portion of the tissue that is currently displayed in the viewer. The navigation controls section 305 includes tools to change the level of magnification by moving the slider 307 to the left or right to decrease or increase the magnification of the image in the viewer 200.

II. How the AI Assistant Can Aid Case Review

Having described the features of the AI Assistant, it will be appreciated that the AI assistant can aid the pathologist in a variety of different tasks. These include tumor detection, tumor grading, tumor quantitation, and increasing confidence in the ultimate assignment of Gleason scoring and Grade Group to a particular biopsy.

Tumor Detection

The AI Assistant highlights every tumor region it finds in prostate needle core biopsies, as demonstrated in FIG. 3 with the borders and yellow and green (and/or red) highlighted areas corresponding to tumor areas with different Gleason scores. These highlighted areas can help the pathologist avoid missing tumor regions in a slide.

Tumor Grading

The AI Assistant assigns a tumor Gleason Grade Group as shown in FIGS. 3 and 4 for the overall biopsy. High inter-observer variability is a known challenge in Gleason grading. However, the machine learning model of the AI Assistant has been trained on thousands of prostate cases, learning from cases graded by both general pathologists and GU subspecialist experts. Using the AI Assistant can help increase the pathologist's concordance with the experts who helped to train it.

As shown in FIGS. 3 and 4, the AI Assistant provides an overall prediction (Gleason Score and Grade Group) for each core biopsy. This overall interpretation involves a holistic read of the tissue. We have found that if the overall prediction is primarily based on the middle level section of the prostate biopsy the accuracy of the prediction is maximized.

As shown in FIGS. 3 and 4, the AI Assistant also provides a grade prediction for each cancerous region identified by evaluating small patches of tissue. These regions can help the pathologist understand the Assistant's final Gleason Score as well as the quantitation values provided by the Assistant.

Tumor Quantitation

As shown in FIGS. 3 and 4, the AI Assistant also automatically calculates quantitative information that is useful to the pathologist, including overall percent tumor involvement by tissue area involved, and percent of each Gleason pattern. These values are intended to help the pathologist be more efficient and accurate in their quantitation estimates. These quantitations are done by averaging the information over all available levels for a given needle core biopsy based on the high accuracy observed for this approach.

The "total tumor percentage" is by area of total tissue involved, it does not include intervening benign tissue. Gleason pattern percentages are the relative percentages of the tumor tissue only, so they will always sum to 100%

Tumor Grading Confidence

As explained above and illustrated in FIG. 6, the AI Assistant also provides information regarding its confidence in Gleason grades across the biopsy. In one configuration, it does this by showing its "top two" choices for each small region, with colored squares to represent the relative confidence of each option. Furthermore, this is configured as an overlay that the user can toggle on and off quickly to facilitate understanding of the model prediction.

Additional Navigation Features

Figure 8:
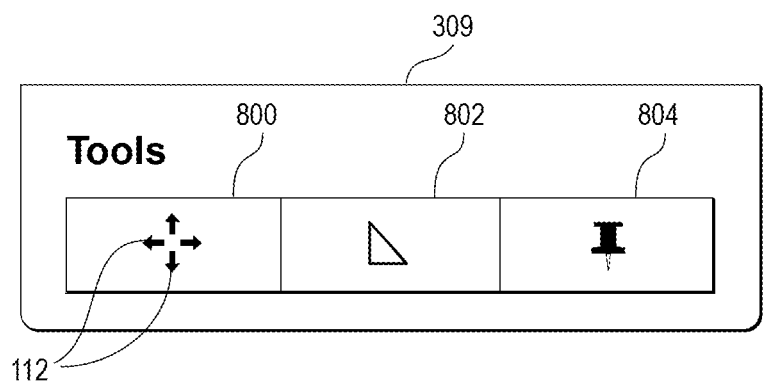
FIG. 8 is an illustration of a set of viewing tools which are available in the display of FIGS. 2-3.

As shown in FIG. 3, the sidebar includes a set of navigation tools 309, which are shown in FIG. 8. These tools include a pan tool 800, a ruler tool 802, and a pin tool 804.

The pan tool 800, when selected, allows the user to pan over and explore any area of the magnified image by clicking and dragging the image. Alternatively, the user can select one of the up and down and right and left arrows 801 and the image will be moved in the direction of the corresponding arrow that is selected.

The Ruler tool 802 allows the user to make length measurements. With the ruler tool selected, the user clicks and drags from end to end to create a new measurement annotation.

The Pins tool 804 allows the user to mark regions, analogous to using a dotting pen on a glass slide. With the pin tool 804 selected, the user clicks on particular location on the slide image to drop a pin. Click once to place the pin and a save pop-up appears, click the Save pop up and the pin location is saved. As an optional feature, before clicking "save", the user is given the option to change the pin's color or leave notes to keep track of any information. To view, edit, or remove a pre-existing pin, select the pin tool, and click on the pin.

The interface of FIG. 3 is also configured such that the user can select tools by clicking on them or using their shortcuts keys (Q=Pan, W=Ruler, E=Marking pin).

The thumbnail view (208, FIG. 3) offers another way of navigation through the slide.

To navigate using the thumbnail view, the user can click and drag the bounding box 210 in the thumbnail to navigate through the selected slide. The thumbnail can be toggled on and off by using the "T" shortcut key on the workstation keyboard ("T"humbnail).

Figure 9:
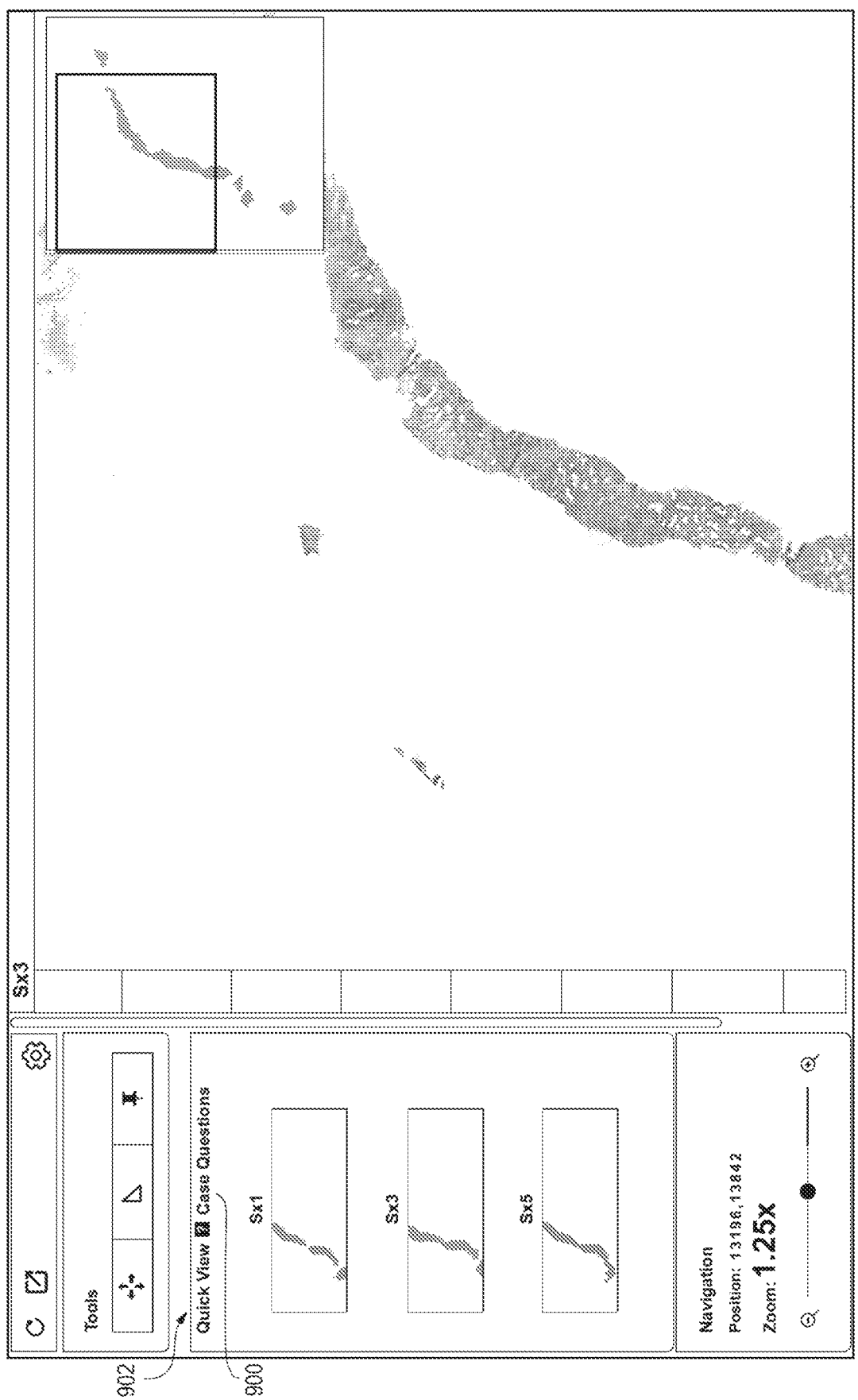
FIG. 9 is an illustration of the display of FIG. 2 showing thumbnail displays of three different sections of the biopsy which can be selected for viewing, and a "Case Questions" icon which, when activated, causes text prompts to appear that allow the pathologist to enter notes or diagnoses regarding the biopsy.
Figure 10:
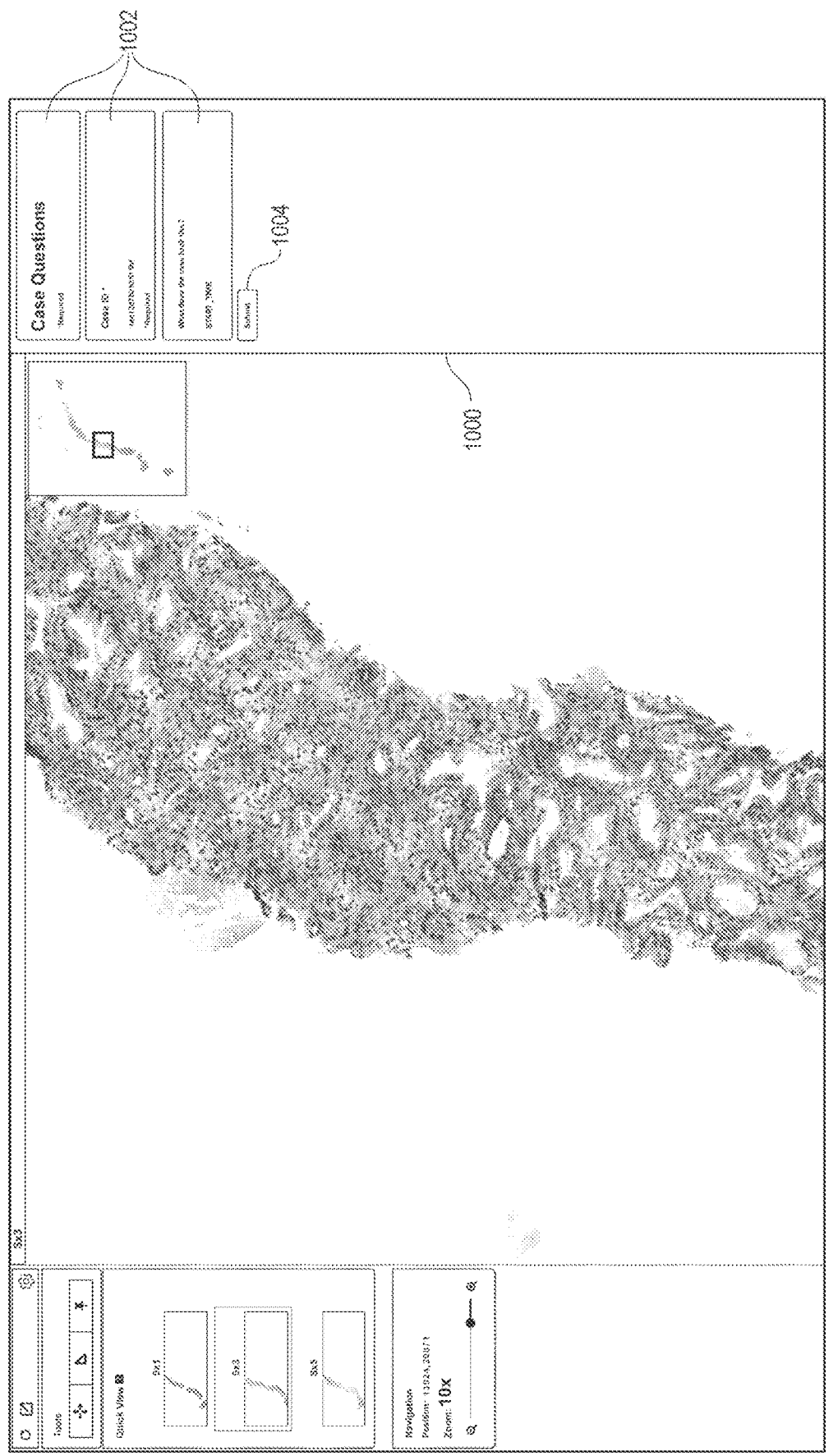
FIG. 10 shows the display of FIG. 9 after activation of the Case questions icon and showing the text prompts in the upper right hand corner.

The viewer also has a feature for allowing the pathologist to submit a diagnosis, response or free text notes regarding the biopsy under review. With reference to FIG. 9, when the user is ready to submit their diagnosis, they click the "Case Questions" icon 900 in the Quick View section 902 of the sidebar, which opens a question form. The main view of the viewer is changed to open a right hand sidebar 1000, shown in FIG. 10, which includes text boxes to fill out form responses or enter free text. The user fills out the boxes 1002 as needed and presses the SUBMIT button 1004 in the bottom of the form. The specific name, purpose, or attribute of the boxes 1002 is not particularly important and can vary widely.

III. AI Assistant Source of Ground Truth and System Performance

The AI Assistant includes a deep learning model (see FIG. 11 and the discussion below) which was trained on thousands of slides, using millions of individual tissue regions.

This included both benign prostate tissue and prostatic adenocarcinoma, allowing the model to learn from the interpretations provided by GU subspecialist pathologists. Tumor slides representing all standard Gleason patterns and all possible Gleason scores were used.

The ground truth Gleason scores in the slides which were used for training the deep learning model was determined by having a panel of GU subspecialists independently grade each biopsy with multiple levels or slices available per biopsy. These ground truth grades were used when evaluating the AI's performance. The GU subspecialists from this panel are leading experts, including prostate guideline committee members and authors on many of the guideline publications for prostate grading.

Overall concordance with the GU expert panel on Gleason Score/Grade group for the AI Assistant was 78%, but for general pathologists was 70%, indicating the superiority of the AI Assistant in Gleason scoring and grade group assignment as compared to a general pathologist.

From this work we discovered certain strengths and limitations of the AI Assistant.

Among the strengths was better performance in grading Gleason 3+3 cases. In particular, the AI Assistant was significantly more concordant with the GU experts on 3+3 cases. The general pathologist cohort tended to overgrade the 3+3 cases more often than the AI Assistant (using the GU expert panel as the ground truth). General pathologist concordance with experts was approximately 65%, whereas AI Assistant concordance with experts was approximately 85%.

Another strength was better performance in grading Gleason 3+4 cases. When general pathologists diagnosed cases as 3+4, they were concordant with the GU subspecialist panel only around 50% of the time, often overgrading relative to the experts. In contrast, when the AI Assistant re-graded these same cases, it was concordant with the GU subspecialist panel approximately 70% of the time, with reduced overgrading of the cases.

Given these observations, if the pathologist is unsure between 3+3 and 3+4, AND the pathologist sees that the AI Assistant is calling 3+3, this might be a scenario for the pathologist to carefully consider the AI Assistant's suggestion in order to avoid overcalling 3+3 as 3+4.

In some implementations, the AI Assistant may not have been specifically trained to identify entities such as: intraductal carcinoma (IDC), high-grade prostatic intraepithelial neoplasia (HGPIN), atypical small acinar proliferation (ASAP) or non-gradable variants, and pathologic findings other than prostatic adenocarcinoma, and in this scenario the AI Assistant only weighs and provides predictions on the presence of prostatic adenocarcinoma in a prostate biopsy. Because of this, any Gleason pattern predictions that overlap with non-Gleason gradable regions should thus be interpreted with caution. However, a pathologist is reviewing all the cases (and rather than a stand-alone AI system) is a key motivation for an AI-assistance system like the present disclosure, as compared to a purely "AI-only" system. This limitation could be overcome by augmenting the training of the machine learning model and providing it with additional prediction heads that identify other pathologic conditions or other types of prostate tissue such as IDC, HGPIN, or ASAP.

Furthermore, in one configuration the input to the AI Assistant is the H&E stained slide image. The AI Assistant does not explicitly take as input other factors, such as: immunohistochemical (IHC) results, patient demographics, and other test results. In other words, the AI Assistant is using a subset of the information that the pathologist has available for this task, i.e., the H&E images. However, the pathologist would normally have access to other factors and information, such as for example IHC results or patient demographics. Thus, the intention is to combine the pathologist's expertise with the AI Assistant predictions for the most accurate H&E evaluation. It is possible to enhance the deep learning model of the AI Assistant, or use it in combination with other machine learning models, for example models trained to make predictions from IHC stained prostate tissue, patient demographics, other tests results such as prostate specific antigen (PSA), etc. and combine the outputs of these other machine learning models with the AI Assistant's predictions to further assist the pathologist in evaluating the H&E images.

Another potential limitation is that the AI Assistant learns to associate particular visual patterns with different Gleason patterns based on the ground truth labels provided by pathologists. Thus, it can sometimes get confused by some of the following phenomena which can be present in the images: artifacts (edge of tissue, crushed or blurry), and benign mimickers of cancer (e.g. atrophy). Because the AI Assistant was not specifically trained on biological or clinical concepts, it can sometimes make mistakes when considered from a clinical or histopathological perspective. For example, isolated tissue may be misclassified as tumor by the AI assistant. As another example, sometimes high grade tumor can loosely resemble benign stroma, if only considering the visual patterns. As such, the pathologist may occasionally see errors where the AI Assistant confuses small regions of benign stroma and Gleason Pattern 5. However, if the user keeps in mind that the AI Assistant has learned to match visual patterns, not concepts, some of its mistakes may make more sense.

Small tumor regions can also present challenges for the AI Assistant. In rare cases, the final Gleason score from the model may not exactly match the specific region-level predictions (especially if total tumor volume is small). In such cases, the final Gleason score prediction is the usually the most accurate, as it can "ignore" questionable individual regions. It is still important that the pathologist still use their experience and judgment in these cases.

The AI assistant is making predictions on individual patches. During training, each slide is divided into small regions, or patches, of 32×32 microns in size, typically a few cells wide.

The AI Assistant learns to label each patch by examining the patch and its nearby surrounding context. The patches will not always line up perfectly with the underlying tissue and biological features. For example, the labeled patches may cut through structures like glands or not line up smoothly with tissue edges. Despite these minor inconveniences, the patch-based strategy is effective at arriving at an accurate overall diagnosis i.e., an accurate final Gleason score by the AI Assistant. The user may also see small, isolated labeled patches, which do not correspond to how a pathologist would interpret the tissue.

Region-Specific Grades

When predicting the Gleason pattern for specific tumor regions, the AI Assistant assigns only one pattern to individual, outlined regions. It never assigns a mixed pattern to a given region. For example, it may split an area that a pathologist would interpret as a mixture of 4 and 5 into two separate regions of 4 and 5, respectively. For example, see FIG. 3. Recall that the machine learning model of the AI Assistant ultimately looks at small patches, one at a time, and can only assign a discrete Gleason pattern to each square. Always assigning a single pattern to discrete regions may be different than the pathologist's usual practice for some cases, but overall performance evaluation confirms accurate final quantitation and Gleason scoring.

IV. Operation of an Example AI Assistant

Figure 12:
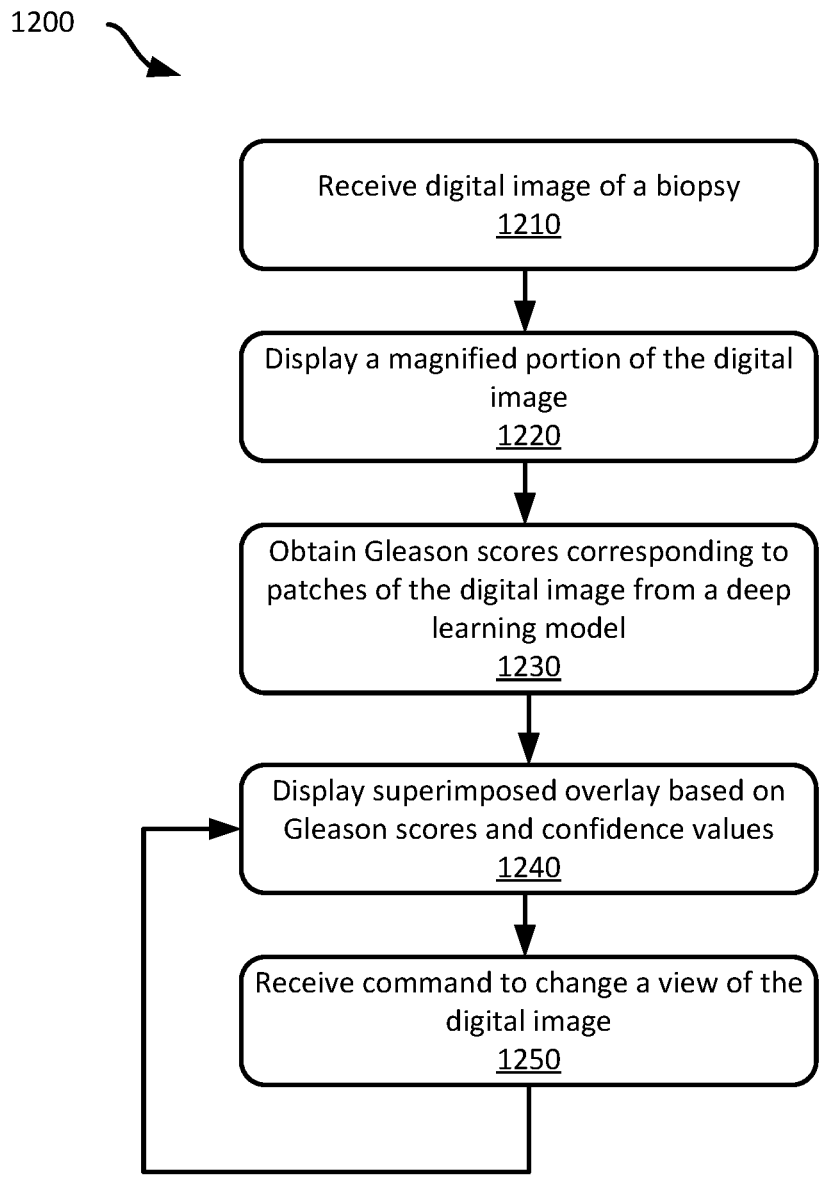
FIG. 12 shows a flowchart for an example method for an AI-based assistant for concurrent review of needle core prostate biopsies.

Referring now to FIG. 12, FIG. 12 illustrates an example method 1200 of operation for an example AI-based assistant, which will be described according to the various embodiments discussed above. However, example methods according to this disclosure may be performed using any suitable embodiment of an AI assistant according to this disclosure.

At block 1210, a computing device, e.g., workstation 102 or computing device 1300, shown receives one or more digital images of a needle core prostate biopsy. As discussed above with respect to FIG. 1, digital images 110a-c may be received from a whole-slide scanner, which captures images of stained biopsy sample slides. For a single biopsy, multiple different such sample slides may be created, which may generate a series of digital images that all relate to the same biopsy. Thus, methods according to this disclosure may involve receiving one or more digital images for a single biopsy and, performing example methods according to this disclosure may involve viewing one or more of the digital images in sequence or in parallel.

The captured images maybe stored locally by the whole slide scanner 108, transmitted to the computing device for storage, or stored within a data storage device at a medical center or at a remote server 122, 124, such as a cloud server.

At block 1220, the computing device causes a display device to display a magnified portion of the digital image. As discussed above, the computing device may execute an AI assistant that provides a graphical user interface ("GUI") that includes viewer 200 to render on a display magnified portions of a digital image, such as the image 202 shown in FIG. 2. The magnification level may be set by the user of the computing device, such as by interacting with one or more controls available within the GUI, such as the slider control 307 shown in FIG. 3, though a default magnification level may be used when the digital image is first displayed in the viewer.

In addition, the user may navigate within the digital image, such as by panning to different portions of the digital image using navigation controls 309 and by zooming in or out of the image. Thus, the user is able to freely view any portion of the digital image, or the entire digital image, such as by zooming to a magnification the fits the entire digital image within the viewer.

At block 1230, the computing device obtains Gleason scores corresponding to the magnified portion of the digital image. As discussed above, a deep learning model may be used to analyze the received digital image(s) to predict Gleason scores for different patches within the image. The Gleason scores may be determined in advance, before the user has begun using the AI assistant, e.g., by immediately processing received digital images. However, in some examples, Gleason scores may be determined in real-time as the user views the digital image. The analysis may be performed on only the portions of the image shown in figure viewer, or over the entire digital image.

The deep learning model may then analyze the image(s) and output predicted Gleason scores for one or more patches within the image as well as confidence values for each Gleason score prediction, generally as described above and below. The predicted Gleason scores and the corresponding confidence values may then be used to generate overlays to be displayed in the viewer.

At block 1240, the computing device causes the display device to display a superimposed overlay on the magnified portion of the digital image based on the Gleason scores and corresponding confidence values of the Gleason scores. As discussed with respect to FIG. 3, the AI assistant generates an overlay based on the Gleason scores and the confidence values. To do so, the AI assistant may generate an outline around contiguous groups of patches with the same Gleason score and display the outline overlaid on the magnified portion of the digital image, such as shown in FIG. 3. In addition, the AI assistant may output the outline with a color corresponding to the Gleason scores of the patches bounded by the outline.

In addition to the outline, the AI assistant may generate colored regions corresponding to the image patches, e.g., colored rectangles, and having one or more colors corresponding to the confidence value for the respective patch. For example, and as discussed above with respect to FIG. 7, the AI assistant may divide each patch into one or more regions, each colored according to a Gleason score and sized according to the relative confidence that the patch corresponds to that Gleason score. Thus, region 612 is assigned a small size as the AI assistant has a low confidence (e.g., 5%) that the patch has a corresponding Gleason score of 5, while it has established a larger region 610 based on having somewhat more confidence (e.g., 15%), that the patch has a corresponding Gleason score of 4. In contrast, the AI assistant has high confidence (e.g., >80%) that the patch has a Gleason score of 3, and thus colored the remainder of the patch green. Thus, a pathologist viewing the patch can understand the predictions from the deep learning model in more detail. However, some examples may only color the patch a single color corresponding to the Gleason score with the highest confidence. Some examples only using a single color if the Gleason score with the highest confidence exceeds a threshold (e.g., 80%), and may otherwise use multiple regions, such as shown in FIG. 7. In some examples, the AI assistant may use a single color for the image patch, but the color may be adjusted based on the relative confidence levels for the various Gleason scores. Thus, if the deep learning model has 80% confidence in a Gleason score of 3 and a 20% confidence in a Gleason score of 4, the AI assistant may shade the patch with color having a mix of green and yellow according to the 80%-20% ratio. If three scores are represented, the color may be a mix of all three colors according to their respective ratios.

The generated overlay thus may simultaneously provide both outlines defining boundaries around regions having the same Gleason score as well as a colored patch-by-patch overlay indicating the confidence levels for each individual patch. In some examples, the user may select which overlay features to display, e.g., only the outline or only the confidence information. The overlay may then be assigned an opacity level and overlaid on top of the magnified portion of the digital image. The user may interact with a GUI element to adjust the opacity of the overlay as discussed above, such as with respect to FIG. 6.

Still other types of information may be overlaid onto the digital image, as discussed above. GUI elements such as annotations or pins may also be displayed with or independently from the Gleason scores and confidence values.

At block 1250, the computing device receives a command from a user interface to change a view of the digital image. In this example, the AI assistant presents the user with a GUI element to enable navigation within the digital image, including panning and zooming. For example, FIGS. 3 and 8 illustrate an example GUI that includes navigation tools 309, including panning 800, and a zoom slider bar 307 to control a zoom level of the digital image. Once the user has provided such a command, the method 1200 returns to block 1240, where it updates the view of the digital image and of the superimposed overlay based on the new view of the digital slide. Further, some examples, may make such updates in real-time as the user pans the image, e.g., while the user continues to input a panning or zooming input, the superimposed overlay is updated continuously and superimposed during the input. In some examples, however, the AI assistant will wait until the user has finished panning or zooming to update and display the superimposed overlay.

The method 1200 may be repeated any number of times for a particular biopsy or number of biopsies. Further, portions of the method 1200 may be repeated during a single execution of the method, such as described above with respect to navigating within a digital image. And while the method has been described as having certain functionality, any suitable variations according to this disclosure may be implemented in different examples.

Figure 13:
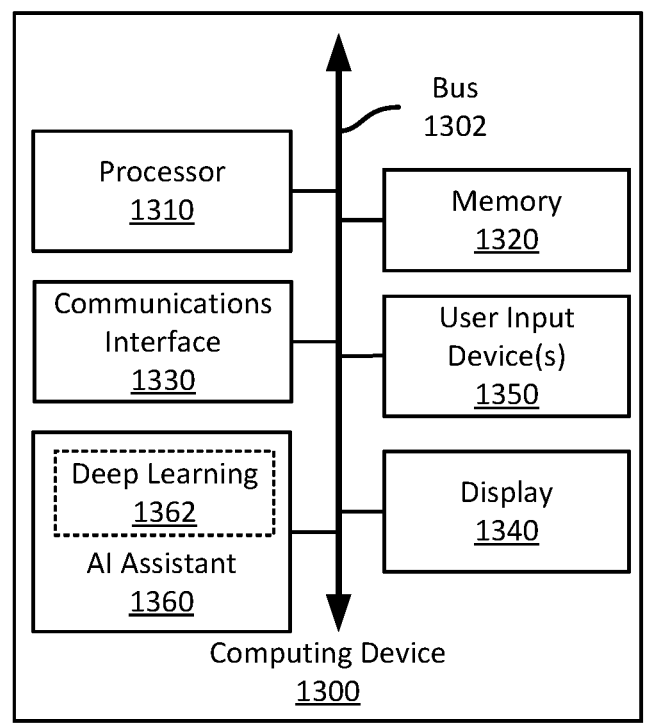
FIG. 13 shows an example computing device suitable for use with systems and methods for AI-based assistants for concurrent review of needle core prostate biopsies.

Referring now to FIG. 13, FIG. 13 shows an example computing device 1300 suitable for use in example systems or methods for AI-based assistants for concurrent review of needle core prostate biopsies according to this disclosure. The example computing device 1300 includes a processor 1310 which is in communication with the memory 1320 and other components of the computing device 1300 using one or more communications buses 1302. The processor 1310 is configured to execute processor-executable instructions stored in the memory 1320 to perform one or more methods for AI-based assistants for concurrent review of needle core prostate biopsies according to different examples, such as part or all of the example method 1200 described above with respect to FIG. 12. The computing device, in this example, also includes one or more user input devices 1350, such as a keyboard, mouse, touchscreen, microphone, etc., to accept user input. The computing device 1300 also includes a display 1340 to provide visual output to a user.

In addition to the components discussed above, the computing device 1300 also includes an AI assistant 1360 according to this disclosure. While the AI assistant 1360 is depicted as a discrete component, in some examples, the AI assistant 1360 may be implemented as processor-executable instructions stored in the memory 1320. Further, in some examples, the computing device 1300 may include a deep learning system 1362, such as the deep learning systems referenced above and described below. Such a deep learning system 1362 may be integrated within the AI assistant 1360, as shown, or may be separately implemented within the computing device 1300, whether in hardware, as software, or a combination of the two. Further in some examples, the deep learning system 1362 may not be part of the computing device 1300 and may be remote from the computing device 1300. In some such examples, the computing device 1300 may employ its communications interface 1330 to communicate with the deep learning system 1362 or to obtain results from analyses performed by the deep learning system 1362.

The computing device 1300 also includes a communications interface 1340. In some examples, the communications interface 1330 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

V. Deep Learning System

Having now described the AI Assistant, how it is used, and its advantages and potential limitations, this document will now describe the development, training and architecture of the deep learning model that is used to generate the predictions and overlays described above.

Slide Preparation and Image Digitization

To generate a set of training images for development and validation of the deep learning model, fresh tissue sections were cut from deaccessioned tissue blocks beyond the 10-year Clinical Laboratory Improvement Amendments (CLIA) archival requirement. Five serial sections of approximately 5-micron thickness were cut in total from each block; sections 1, 3, and 5 were H&E-stained, while section 4 was triple-stained with the PIN4 immunohistochemistry cocktail. Slides from each of the 4 data sources (referred to here as "ML1", "ML2", "UH", and "TTH") were cut and stained by 4 separate laboratories. In total, 1339 cases were initially scanned for the validation set; 757 were subsequently used based on genitourinary specialist review availability and exclusion criteria. Development set slides from ML1 followed a similar procedure to those above without obtaining a triple-stained PIN4 cocktail for each case, while development slides from TTH were obtained by scanning slides within the 10-year CLIA archival requirement. From UH, anonymized digital H&E slides were obtained. Slides from TTH, ML1, and ML2 were digitized for purposes of this study using a Leica Aperio AT2 scanner at a resolution of 0.25 µm/pixel ("40× magnification"), while digital slides obtained from UH were each previously scanned on a Hamamatsu NanoZoomer 5360 scanner at a resolution of 0.23 µm/pixel ("40× magnification") or 0.46 µm/pixel ("20× magnification").

Glandular Annotations

Detailed "region-level annotations" that label glands or regions such as groups of glands were collected. Annotations were performed in a custom histopathology viewer using free-drawing tools, typically between 5× and 20× magnifications (available range of magnification was 0.04× to 40×). Pathologists outlined regions as "Non-tumor", and Gleason patterns (GP): "GP3", "GP4", and "GP5". In cases of true histological ambiguity, annotators were given the ability to assign mixed-grades (e.g. "3+4"); these annotations were used at training time as the primary GP (e.g. "3").

Model Architecture

Figure 11:
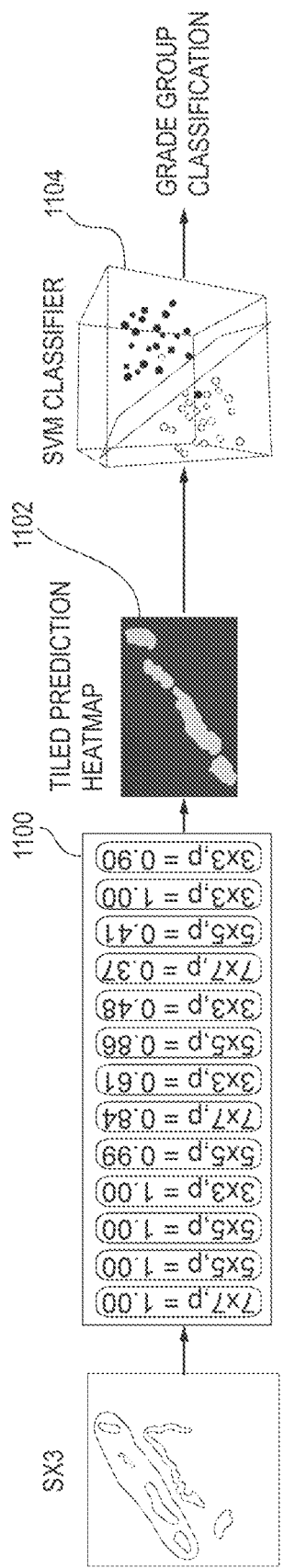
FIG. 11 is an illustration of the deep learning system that supports and provides predictions for the AI Assistant and in particular is used to generate the Gleason score pattern localization predictions within the image, and the overall Gleason score and Gleason Grade Group classification of FIGS. 3 and 4.

The Deep Learning System, also referred to herein as "deep learning model" for the AI Assistant, is shown in FIG. 11. The system consists of two stages: a convolutional neural network (CNN) 1100 that classifies image patches within each biopsy, producing a predictions heatmap 1102 from which the color-coded Gleason score overlays of FIG. 3 are generated in the viewer. This convolutional neural network 1100 is followed by a second machine learning model 1104 (in one implementation, a support vector machine, or SVM) that uses features extracted from the resulting heatmap 1102 to classify the biopsy's overall Grade Group (GG).

We first describe the development of the custom CNN architecture for Gleason grading, followed by the training and tuning of the discovered network, and lastly the training and tuning of the second-stage SVM. Tensorflow2 version 1.14.0 was used in construction of the convolutional neural network 1100, while Scikit-learn3 version 0.20.0 was used for SVM (1104) development.

Model Development

To develop a CNN architecture specifically for Gleason grading, we use a modified version of Proxyless Neural Architecture Search (Proxyless-NAS). Cai, H et al., ProxylessNAS: Direct Neural Architecture Search on Target Task and Hardware (2018).

Briefly, the neural networks were defined by combining a set of modules, and each module had multiple different configurations. Proxyless-NAS programmatically searched through a pre-specified configuration search space to create the final neural network architecture. The search space was constructed by specifying the number of modules in the network and allowing each module to vary among several predefined configurations. In each iteration, Proxyless-NAS sampled a neural network, evaluated the performance, and updated the parameters of the search algorithm. To estimate the performance of a sampled network, we trained the network and computed the loss function on a held-out subset of the development set. The final neural network used was obtained by selecting the configuration with the highest score for each module.

In the architecture search, a basis is required for the design of search space, termed a "backbone". In this case, we used the Xception architecture (see Chollet, F. Xception: Deep Learning with Depthwise Separable Convolutions. 2017 IEEE Conference on Computer Vision and Pattern Recognition (CVPR) (2017)), a performant network at image classification and segmentation tasks, and constructed a search space to allow for flexibility in the receptive field of the network. Specifically, the Xception architecture consists of twelve total modules bracketed by skip connections (see He K., et al. Deep Residual Learning for Image Recognition. 2016 IEEE Conference on Computer Vision and Pattern Recognition (CVPR) (2016), (3 in the "entry flow", 8 in the "middle flow" and 1 in the "exit flow"), with each module having two or three 3×3 convolutions. In the search space, we included alternate configurations in place of these ones: modules composed of 5×5 convolutions or 7×7 convolutions. Similarly, the search space also included the choice of swapping the last two 3×3 convolutions for two 5×5 convolutions or two 7×7 convolutions respectively. Skipping of the "middle flow" modules (i.e. an identity operation module) was also permitted such that the search could trade off depth and width as necessary. As such, the search space consisted of approximately 16 million possible architectures, one of which is the original Xception network.

The architecture search was conducted using the dataset (from previous work) for Gleason Grading of prostatectomies because of the larger number of glandular ("region-level") annotations in that dataset. This dataset was split into training and tuning sets: 3 million patches were sampled from the training set for use as the search process's training set, and 1 million patches were subsampled from the tuning set for use as the search process's tuning set.

Hyperparameters for the deep learning system are presented in Table 1.

TABLE 1

Hyperparameters for the Deep Learning System. Headings are bolded for visual clarity.

| Architecture search hyperparameters | | | |
|---|---|---|---|
| Neural network learning rate schedule | Cosine decay with linear warmup schedule<br>Base rate: $4.2 \times 10^{-3}$<br>Decay steps: 50000<br>Fraction of training steps used for linear warmup: 0.025 | | |
| Neural network RMSProp optimizer | Decay: 0.9<br>Momentum: 0.9<br>Epsilon: 1.0 | | |
| Controller Adam optimizer | Base rate: $2.5 \times 10^{-4}$<br>Momentum: 0.95<br>Beta1: 0.000<br>Beta2: 0.999<br>Epsilon: $1 \times 10^{-8}$ | | |
| Batch size | 128 | | |
| Network pre-training hyperparameters (prostatectomy data) | | | |
| Color perturbations | Saturation delta: 0.80<br>Brightness delta: 0.96<br>Contrast delta: 0.17<br>Hue delta: 0.02 | | |
| Learning rate schedule | Exponential decay schedule<br>Base rate: 0.0042<br>Decay rate: 0.95<br>Decay steps: 51,733 steps | | |
| RMSProp optimizer | Decay: 0.95<br>Momentum: 0.7<br>Epsilon: 0.001 | | |
| Other | Loss function: softmax cross-entropy<br>Batch size: 32 | | |
| | Fold 1 | Fold 2 | Fold 3 |
| Network refinement hyperparameters (biopsy data) | | | |
| Image augmentations | Saturation delta: 0.53<br>Brightness delta: 0.32<br>Contrast delta: 0.61<br>Hue delta: 0.01<br>Cutout box size: 50 × 50 pixels | | |
| Learning rate schedule (exponential decay schedule) | Base rate: $2.3 \times 10_{-5}$<br>Decay rate: 0.70<br>Decay steps: 72,466 | Base rate: $3.2 \times 10_{-5}$<br>Decay rate: 0.50<br>Decay steps: 75,936 | Base rate: $3.8 \times 10_{-5}$<br>Decay rate: 0.95<br>Decay steps: 28,512 |
| RMSProp optimizer | Decay: 0.90<br>Momentum: 0.90<br>Epsilon: 1.00 | Decay: 0.95<br>Momentum: 0.90<br>Epsilon: 1.0 | Decay: 0.95<br>Momentum: 0.70<br>Epsilon: 0.10 |
| Other | Loss function: Ordinal cross-entropy<br>Batch size: 32 | | |
| Support Vector Machine hyperparameters | | | |
| Penalty parameter ('C') | 100 | | |
| Kernel | RBF, Gamma = 0.25 | | |

Architecture Training and Ensembling

The top discovered architecture, shown in FIG. 11 at 1100, was then retrained and tuned using the full prostatectomy development and validation sets. Color augmentations, orientation randomization, and stain normalization were employed to improve performance, and hyperparameters were tuned using Google Vizier7.

Next, the network 1100 was refined using annotated biopsies, see Table 2 below. Annotated biopsy slides were randomly split into three folds, and three separate networks were initialized from the same prostatectomy-trained weights and refined using each of the dataset folds. In addition to color augmentation, orientation randomization, and stain normalization, cutout augmentations were additionally used to improve model performance. Hyperparameters for each fold were tuned using Google Vizier. An ordinal loss function was used for training and refinement.

TABLE 2

Characteristics of the development set. The development set contains prostate biopsy cases from a large tertiary teaching hospital (TTH), a medical laboratory (ML1), and a University Hospital (UH). Biopsy-level pathologic reviews were obtained from ML1 and TTH, while detailed region-level annotations were obtained from all three sources.

Biopsy-Level Reviews

Genitourinary-specialist reviews

|  | Medical Laboratory 1 | Tertiary Teaching Hospital | Total |
|---|---|---|---|
| Non-tumor | 72 | 50 | 122 |
| Grade Group 1 | 30 | 172 | 202 |
| Grade Group 2 | 19 | 111 | 120 |
| Grade Group 3 | 5 | 42 | 47 |
| Grade Group 4-5 | 37 | 42 | 79 |
| Total | 165 reviews/ 135 biopsies/ 135 cases | 417 reviews/ 389 biopsies/ 225 cases | 580 reviews/ 524 biopsies/ 360 cases |

Region-Level Annotated Biopsy Patches

Genitourinary-specialist reviews

|  | Medical Laboratory 1 | Tertiary Teaching Hospital | University Hospital | Total |
|---|---|---|---|---|
| Non-tumor | 182,938 | 620,916 | 495,715 | 1,299,569 |
| Gleason Pattern 3 | 15,790 | 43,998 | 82,740 | 142,528 |
| Gleason Pattern 4 | 28,207 | 112,120 | 59,897 | 200,224 |
| Gleason Pattern 5 | 2,742 | 28,158 | 8,066 | 38,966 |
| Total | 229,677 patches/ 73 biopsies | 805,192 patches/ 156 biopsies | 646,418 patches/ 115 biopsies | 1,681,287 patches/ 344 biopsies |

Finally, at evaluation time, nine models were trained and ensembled (three models for each of the three folds) by taking the geometric mean across all model predictions for each patch.

Thresholding and Stage 2 Features

The DLS's first stage assigned the probabilities (in the range [0, 1]) of each patch to be one of four classes: non-tumor or GP (Gleason Pattern), GP4, or GP5. To map these probabilities to a predicted class, we thresholded the predictions. First, a patch was categorized as non-tumor if the predicted non-tumor probability exceeded 0.2. Otherwise, the top two GPs' predicted probabilities were re-normalized to sum to 1.0, and compared against a threshold based on the specific GPs. The thresholds were 0.65 for GP3/4, 0.94 for GP 3/5, and 0.90 for GP4/5; the more severe GP was assigned if the threshold was exceeded. These thresholds were selected empirically via 10-fold cross validation on the development set to optimize slide-level concordance with subspecialist-provided Gleason pattern percentages.

Features were then extracted from both the predicted probabilities for each patch and the 4-class categorization. A SVM (FIG. 11, 1104) then used these features to classify each biopsy as: non-tumor, GG1, GG2, GG3, or GG4-5. The features were the percent of biopsy classified as non-tumor, percent of tumor classified as GP4, and GP5 respectively, the lowest predicted patch-wise non-tumor probability, and the 98th percentile of the patch-wise predicted probabilities for GP4 and GP5 respectively. Hyperparameters for the SVM were tuned using 10-fold cross validation across the biopsy-level dataset and are presented in Table 1. The predicted probabilities of the SVM for each category were summed for the purposes of receiver operating characteristic (ROC) analyses. For example, among non-tumor cases, plotting the ROC of GG1-2 vs GG3-5 involved summing for each case the SVM's predicted probability values of GG1 and GG2, versus GG3 and GG4-5.

Statistical Analysis

To compute 95% confidence intervals, we used a slide resampling bootstrap approach. In each iteration of the bootstrap, we sample with replacement a set of slides of the same size as the original set, and compute the metric of interest. After 1000 iterations, we report the 2.5th and 97.5th percentiles as the confidence interval bounds. The DLS's Gleason grading concordance with the majority opinion of subspecialists was additionally evaluated by area under the receiver operating characteristic curve (Area under ROC, AUC) analysis. The AUCs were estimated using the Wilcoxon (Mann-Whitney) U statistic, a standard nonparametric method employed by most modern software libraries. To obtain binary outcomes necessary for AUC analysis, the five categories of Gleason scores were dichotomized using clinically important cutoffs. Specifically, we used ROC analysis to evaluate DLS grading of slides as GG1 vs. GG2-5, a distinction representing the clinically significant threshold for potential eligibility for active surveillance versus prostatectomy/definitive treatment. We also evaluated the tumor versus non-tumor threshold to represent the important diagnostic step of establishing a prostatic adenocarcinoma diagnosis. Lastly we evaluated GG1-2 versus GG3-5 as some patients with GG2 may still be managed with active surveillance if only a very low amount of Gleason pattern 4 was present.

VI. Further Considerations

The AI Assistant user interface elements and deep learning model of this disclosure can be coded as software instructions that are resident in memory of a processing for the workstation of FIG. 1, or stored in remote computing platforms.

While the Figures have shown in detail one possible configuration of a viewer with a suite of AI user interface elements for assisting a pathologist in reviewing a needle core prostate biopsy, it will be appreciated that the particular details on how the tools are presented to the user and configuration of the user interface can vary widely from the specifics of the illustrated embodiment. Furthermore, the elements described above could be implemented separately, e.g., from different screens or menus, as well as together as a suite of elements present in a single display as shown in the Figures.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A system comprising:
   a non-transitory computer-readable medium; and
   one or more processors communicatively coupled to the communications interface and the non-transitory computer-readable medium, the one or more processors configured to execute processor-executable instructions stored in the non-transitory computer-readable medium to:
   receive a selection of a digital image of a needle core prostate biopsy having corresponding Gleason score information generated by a deep learning model, the Gleason score information comprising one or more Gleason scores and one or more confidence values corresponding to image patches in the digital image;
   cause a display device to display a magnified portion of the digital image;
   obtain a subset of the Gleason score information corresponding to image patches in the magnified portion of the digital image; and
   cause the display device to display a superimposed overlay on the magnified portion of the digital image based on the Gleason score and corresponding confidence values of the Gleason score, the superimposed overlay comprising one or more outlines corresponding one or more Gleason scores associated with the magnified portion of the digital image and comprising image patches having colors based on a Gleason score of the Gleason scores corresponding to an underlying portion of the magnified portion of the digital image and an overlay providing confidence values for the image patches and the corresponding Gleason scores.

2. The system of claim 1, wherein the one or more processors are configured to execute further processor-executable instructions stored in the non-transitory computer-readable medium to:
   receive a command from a user interface to change a view of the digital image, the changed view comprising a different magnified portion of the digital image; and
   cause the display device to display an updated superimposed overlay on the different magnified portion of the digital image based on the Gleason scores and corresponding confidence values of the Gleason scores, the updated superimposed overlay comprising one or more outlines corresponding one or more Gleason scores associated with the different magnified portion of the digital image and comprising updated image patches having colors based on a Gleason score of the Gleason scores corresponding to an underlying portion of the different magnified portion of the digital image and a confidence value of the corresponding Gleason score.

3. The system of claim 2, wherein the one or more processors are configured to execute further processor-executable instructions stored in the non-transitory computer-readable medium to update the superimposed overlay in real-time as the view of the digital image changes.

4. The system of claim 1, wherein the one or more processors are configured to execute further processor-executable instructions stored in the non-transitory computer-readable medium to:

receive a plurality of digital images of the needle core prostate biopsy; and cause the display device to display an interactive user interface element for navigating between the plurality of digital images.

5. The system of claim 1, wherein the one or more processors are configured to execute further processor-executable instructions stored in the non-transitory computer-readable medium to:

obtain, from the deep learning model, a prediction of a final Gleason Grade for the biopsy; and cause the display device to display the prediction of the final Gleason Grade for the biopsy.

6. The system of claim 1, wherein the one or more processors are configured to execute further processor-executable instructions stored in the non-transitory computer-readable medium to:

obtain a relative proportion by area of the tumor of different Gleason scores and the amount of tumor as a percent of tissue for the biopsy; and cause the display device to display the relative proportion by area of each Gleason score and the amount of tumor as a percent of tissue for the digital image.

7. The system of claim 1, further comprising the deep learning model, the deep learning model trained to make the predictions of Gleason scores of portions of the digital image, a relative proportion by area of the tumor of different Gleason scores, an amount of tumor as a percent of tissue for the biopsy, and a prediction of a final Gleason Grade for the biopsy, and wherein the deep learning model comprises a combination of a deep convolutional neural network trained to make the predictions of Gleason scores of portions of the digital image and a support vector machine to generate data for the prediction of a final Gleason Grade for the biopsy.

8. The system of claim 1, wherein the one or more processors are configured to execute further processor-executable instructions stored in the non-transitory computer-readable medium to:

cause the display device to display a viewing pane showing a portion of the magnified digital image, cause the display device to display a thumbnail region showing the biopsy including a box indicating where in the biopsy the viewing pane is showing the magnified portion of the digital image; and cause the display device to display a sidebar arranged peripheral to the viewing pane and comprising icons for activating and controlling which portion of the digital image is displayed in the viewing pane and an opacity of the colors overlaid on the image patches.

9. The system of claim 8, wherein the biopsy comprises multiple slices of prostate tissue, each having its associated digital image, and wherein the sidebar further includes thumbnail images of the digital images of the multiple slices.

10. The system of claim 8, wherein the one or more processors are configured to execute further processor-executable instructions stored in the non-transitory computer-readable medium to display user interface elements for panning around the digital image, making measurements within the digital image, and marking virtual pins in the digital image.

11. A method comprising:

receiving a selection of a digital image of a needle core prostate biopsy having corresponding Gleason score information generated by a deep learning model, the Gleason score information comprising one or more Gleason scores and one or more confidence values corresponding to image patches in the digital image;

displaying, using a display device, a magnified portion of the digital image;

obtaining a subset of the Gleason score information corresponding to image patches in the magnified portion of the digital image; and displaying, using the display device, a superimposed overlay on the magnified portion of the digital image based on the Gleason score and corresponding confidence values of the Gleason scores, the superimposed overlay comprising one or more outlines corresponding one or more Gleason scores associated with the magnified portion of the digital image and comprising image patches having colors based on a Gleason score of the Gleason scores corresponding to an underlying portion of the magnified portion of the digital image and an overlay providing confidence values for the image patches and the corresponding Gleason scores.

12. The method of claim 11, further comprising:

receiving a command from a user interface to change a view of the digital image, the changed view comprising a different magnified portion of the digital image; and displaying an updated superimposed overlay on the different magnified portion of the digital image based on the Gleason scores and corresponding confidence values of the Gleason scores, the updated superimposed overlay comprising one or more outlines corresponding one or more Gleason scores associated with the different magnified portion of the digital image and comprising updated image patches having colors based on a Gleason score of the Gleason scores corresponding to an underlying portion of the different magnified portion of the digital image and a confidence value of the corresponding Gleason score.

13. The method of claim 11, further comprising updating the superimposed overlay in real-time as the view of the digital image changes.

14. The method of claim 11, further comprising:

receiving a plurality of digital images of the needle core prostate biopsy; and causing the display device to display an interactive user interface element for navigating between the plurality of digital images.

15. The method of claim 11, further comprising:

obtaining, from the deep learning model, a prediction of a final Gleason Grade for the biopsy; and displaying the prediction of the final Gleason Grade for the biopsy.

16. The method of claim 11, further comprising:

obtaining a relative proportion by area of the tumor of different Gleason scores and the amount of tumor as a percent of tissue for the biopsy; and displaying the relative proportion by area of each Gleason score and the amount of tumor as a percent of tissue for the digital image.

17. The method of claim 11, wherein the deep learning model is trained to make the predictions of Gleason scores of portions of the digital image, a relative proportion by area of the tumor of different Gleason scores, an amount of tumor as a percent of tissue for the biopsy, and a prediction of a final Gleason Grade for the biopsy, and wherein the deep learning model comprises a combination of a deep convolutional neural network trained to make the predictions of Gleason scores of portions of the digital image and a support vector machine to generate data for the prediction of a final Gleason Grade for the biopsy.

18. The method of claim 11, further comprising:
displaying a viewing pane showing a portion of the magnified digital image,
displaying a thumbnail region showing the biopsy including a box indicating where in the biopsy the viewing pane is showing the magnified portion of the digital image; and
displaying a sidebar arranged peripheral to the viewing pane and comprising icons for activating and controlling which portion of the digital image is displayed in the viewing pane and an opacity of the colors overlaid on the image patches.

19. The method of claim 18, wherein the biopsy comprises multiple slices of prostate tissue, each having its associated digital image, and wherein the sidebar further includes thumbnail images of the digital images of the multiple slices.

20. The method of claim 18, further comprising displaying user interface elements for panning around the digital image, making measurements within the digital image, and marking virtual pins in the digital image.

21. A non-transitory computer-readable medium comprising processor-executable instructions configured to cause one or more processors to:
receive a selection of a digital image of a needle core prostate biopsy having corresponding Gleason score information generated by a deep learning model, the Gleason score information comprising one or more Gleason scores and one or more confidence values corresponding to image patches in the digital image;
cause a display device to display a magnified portion of the digital image;
obtain a subset of the Gleason score information corresponding to image patches in the magnified portion of the digital image; and
cause the display device to display a superimposed overlay on the magnified portion of the digital image based on the Gleason scores and corresponding confidence values of the Gleason score, the superimposed overlay comprising one or more outlines corresponding one or more Gleason scores associated with the magnified portion of the digital image and comprising image patches having colors based on a Gleason score of the Gleason scores corresponding to an underlying portion of the magnified portion of the digital image and an overlay providing confidence values for the image patches and the corresponding Gleason scores.

22. The non-transitory computer-readable medium of claim 21, further comprising processor-executable instructions configured to cause the one or more processors to:
receive a command from a user interface to change a view of the digital image, the changed view comprising a different magnified portion of the digital image; and
cause the display device to display an updated superimposed overlay on the different magnified portion of the digital image based on the Gleason scores and corresponding confidence values of the Gleason scores, the updated superimposed overlay comprising one or more outlines corresponding one or more Gleason scores associated with the different magnified portion of the digital image and comprising updated image patches having colors based on a Gleason score of the Gleason scores corresponding to an underlying portion of the different magnified portion of the digital image and a confidence value of the corresponding Gleason score.

23. The non-transitory computer-readable medium of claim 22, further comprising processor-executable instructions configured to cause the one or more processors to update the superimposed overlay in real-time as the view of the digital image changes.

24. The non-transitory computer-readable medium of claim 21, further comprising processor-executable instructions configured to cause the one or more processors to:
receive a plurality of digital images of the needle core prostate biopsy; and
cause the display device to display an interactive user interface element for navigating between the plurality of digital images.

25. The non-transitory computer-readable medium of claim 21, further comprising processor-executable instructions configured to cause the one or more processors to:
obtain, from the deep learning model, a prediction of a final Gleason Grade for the biopsy; and
cause the display device to display the prediction of the final Gleason Grade for the biopsy.

26. The non-transitory computer-readable medium of claim 21, further comprising processor-executable instructions configured to cause the one or more processors to:
obtain a relative proportion by area of the tumor of different Gleason scores and the amount of tumor as a percent of tissue for the biopsy; and
cause the display device to display the relative proportion by area of each Gleason score and the amount of tumor as a percent of tissue for the digital image.

27. The non-transitory computer-readable medium of claim 21, further comprising the deep learning model, the deep learning model trained to make the predictions of Gleason scores of portions of the digital image, a relative proportion by area of the tumor of different Gleason scores, an amount of tumor as a percent of tissue for the biopsy, and a prediction of a final Gleason Grade for the biopsy, and wherein the deep learning model comprises a combination of a deep convolutional neural network trained to make the predictions of Gleason scores of portions of the digital image and a support vector machine to generate data for the prediction of a final Gleason Grade for the biopsy.

28. The non-transitory computer-readable medium of claim 21, further comprising processor-executable instructions configured to cause the one or more processors to:
cause the display device to display a viewing pane showing a portion of the magnified digital image,
cause the display device to display a thumbnail region showing the biopsy including a box indicating where in the biopsy the viewing pane is showing the magnified portion of the digital image; and
cause the display device to display a sidebar arranged peripheral to the viewing pane and comprising icons for activating and controlling which portion of the digital image is displayed in the viewing pane and an opacity of the colors overlaid on the image patches.

29. The non-transitory computer-readable medium of claim 28, wherein the biopsy comprises multiple slices of prostate tissue, each having its associated digital image, and wherein the sidebar further includes thumbnail images of the digital images of the multiple slices.

30. The non-transitory computer-readable medium of claim 28, further comprising processor-executable instructions configured to cause the one or more processors to cause the display device to display user interface elements for panning around the digital image, making measurements within the digital image, and marking virtual pins in the digital image.

* * * * *